(12) United States Patent
Inoue et al.

(10) Patent No.: US 9,996,107 B2
(45) Date of Patent: Jun. 12, 2018

(54) ACCESSORY AND INFORMATION PROCESSING SYSTEM

(71) Applicant: NINTENDO CO., LTD., Kyoto (JP)

(72) Inventors: Fumihiko Inoue, Kyoto (JP); Shinichi Kinuwaki, Kyoto (JP); Yoshitaka Tamura, Kyoto (JP); Yoshiyasu Ogasawara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 188 days.

(21) Appl. No.: 15/010,153

(22) Filed: Jan. 29, 2016

(65) Prior Publication Data

US 2016/0231773 A1   Aug. 11, 2016

(30) Foreign Application Priority Data

Feb. 10, 2015   (JP) ................................. 2015-024052

(51) Int. Cl.

| | | |
|---|---|---|
| G06F 1/16 | (2006.01) | |
| G06F 3/02 | (2006.01) | |
| G06F 3/00 | (2006.01) | |
| H04M 1/725 | (2006.01) | |
| A63F 13/00 | (2014.01) | |
| H04M 1/23 | (2006.01) | |

(52) U.S. Cl.
CPC ............ *G06F 1/1607* (2013.01); *A63F 13/00* (2013.01); *G06F 1/1686* (2013.01); *G06F 3/005* (2013.01); *G06F 3/0227* (2013.01); *H04M 1/72527* (2013.01); *H04M 1/23* (2013.01)

(58) Field of Classification Search
CPC ........ A63F 13/00; G06F 1/1686; G06F 3/005; G06F 1/1607; G06F 3/022; H04M 1/72527; H04M 1/23
USPC .................................................. 345/156–169
See application file for complete search history.

(56) References Cited

U.S. PATENT DOCUMENTS

| | | |
|---|---|---|
| 8,482,540 B1 | 7/2013 | Reeves et al. |
| 2006/0256090 A1 | 11/2006 | Huppi |
| 2011/0090177 A1* | 4/2011 | Chuang .................. G06F 3/042 345/175 |
| 2012/0287051 A1 | 11/2012 | Takabu |

FOREIGN PATENT DOCUMENTS

JP   2010-17387   1/2010

OTHER PUBLICATIONS

European Search Report dated Jun. 22, 2016 issued in corresponding European Application No. 16152949.0 (8 pgs.).

* cited by examiner

*Primary Examiner* — Stacy Khoo
(74) *Attorney, Agent, or Firm* — Nixon & Vanderhye PC

(57) ABSTRACT

An example accessory can be attached to an information processing device. The accessory includes a housing, a movable operation section, and a movable portion. An inside of the housing is visible from an outside thereof through at least a portion thereof. At least a portion of the operation section is exposed on the outside of the housing. The movable portion is placed at a position inside the housing that is visible from the outside of the housing through the portion of the housing. A position and/or an attitude of the movable portion changes in response to the operation section being operated.

4 Claims, 17 Drawing Sheets

ACCESSORY AND INFORMATION PROCESSING SYSTEM

CROSS REFERENCE TO RELATED APPLICATION

The disclosure of Japanese Patent Application No. 2015-024052, filed on Feb. 10, 2015, is herein incorporated by reference.

FIELD

The present technique relates to an information processing system including an information processing device and an accessory that can be attached to the information processing device, and relates to an accessory, an information processing device, a storage medium storing an information processing program, an operation determination method and a process performing method, for use in the information processing system.

BACKGROUND AND SUMMARY

There are conventional accessories which, when connected to a portable device, add functions to the portable device. For example, there are techniques where an external controller as an accessory is connected to a connector provided on a controller of a game device. This enables a wider variety of game operations using two controllers.

Conventional accessories have a circuit configuration for communicating with a portable device or a circuit configuration for performing an information process for generating information to be transmitted to a portable device, and there has been room for improvement in simplifying the configuration of the accessories.

Thus, the present specification discloses an accessory, an information processing device, an information processing system, a storage medium storing an information processing program, an operation determination method and a process performing method, with which it is possible to simplify the configuration of the accessory.

(1)

An example accessory described herein can be attached to an information processing device. The accessory includes a housing, an operation section, and a movable portion. An inside of the housing is visible from an outside thereof through at least a portion thereof. The operation section is a movable operation section at least a portion of which is exposed on the outside of the housing. The movable portion is placed at a position inside the housing that is visible from the outside of the housing through the portion of the housing, and a position and/or an attitude of the movable portion changes in response to the operation section being operated.

(2)

A portion of the housing may have an opening. The movable portion may be placed at a position inside the housing that is visible from the outside of the housing through the opening portion of the housing.

(3)

The movable portion may include an identification portion in an area that is visible from the outside of the housing through the portion of the housing, wherein the identification portion is distinguishable from other portions.

(4)

At least a portion of the area of the movable portion that is visible from the outside of the housing through the portion of the housing may be formed by a member that can be identified by an infrared camera.

(5)

The accessory may further include a connecting portion for connecting the housing with the information processing device so that the portion of the housing is covered by the information processing device to which the accessory is attached.

(6)

The movable portion may move, in response to the operation section being operated, in at least one of an up-down direction, a left-right direction and a front-rear direction as seen through the portion of the housing.

(7)

The operation section and the movable portion may be configured as an integral part.

(8)

On the inside of the housing, a predetermined marker may be provided at a position inside the housing that is visible from the outside of the housing through the portion of the housing, wherein the position at which the movable portion is provided is different from the position at which the marker is provided.

(9)

The operation section may include a first operation member and a second operation member that can be operated independently of each other. The first operation member and the second operation member may be arranged in line with each other in a front-rear direction as seen through the portion of the housing. The movable portion may include a first movable portion of which a position and/or an attitude changes in response to the first operation member being operated, and a second movable portion of which a position and/or an attitude changes in response to the second operation member being operated. The first movable portion may be displaced from the second movable portion as seen through the portion of the housing.

(10)

The operation section may be configured to be rotatable. The movable portion may rotate in accordance with rotation of the operation section, and a shape and/or a design pattern of the movable portion as seen through the portion of the housing changes as the movable portion rotates.

(11)

An example information processing system described herein is an information processing system including an information processing device having a camera, and an accessory which can be attached to the information processing device.

The accessory includes a housing, a movable operation section, and a movable portion. An inside of the housing is visible from an outside thereof through at least a portion thereof. The operation section is a movable operation section at least a portion of which is exposed on the outside of the housing. The movable portion is placed at a position inside the housing that is visible from the outside of the housing through the portion of the housing, wherein a position and/or an attitude of the movable portion changes in response to the operation section being operated. The accessory is attached to the information processing device at such a position that the camera can capture an image of the inside of the housing through the portion of the housing.

The information processing device includes an operation determination unit and a process performing unit. The operation determination unit determines an operation performed on the operation section based on a camera image captured by the camera and including an image of the movable portion. The process performing unit performs a predetermined process based on the operation determined by the operation determination unit.

(12)

The operation determination unit may determine whether or not the operation section is operated based on the camera image. The process performing unit may perform a predetermined process based on whether or not the operation section is operated.

(13)

The operation determination unit may calculate an amount of operation performed on the operation section based on the camera image. The process performing unit may perform a predetermined process based on the amount of operation.

(14)

On the inside of the housing, a predetermined marker may be provided at a position inside the housing that is visible from the outside of the housing through the portion of the housing, wherein the position at which the movable portion is provided is different from the position at which the marker is provided. The operation determination unit may recognize the predetermined marker in the camera image to determine an operation performed on the operation section based on at least one of a position, a direction and a shape of an image of the movable portion with respect to the marker in the camera image.

(15)

Another example information processing system described herein is an information processing system including an information processing device having a camera, and an accessory which can be attached to the information processing device. The accessory includes a housing of which an inside is visible from an outside thereof through at least a portion thereof. On the inside of the housing, a predetermined marker is provided at a position inside the housing that is visible from the outside of the housing through the portion of the housing. The accessory can be attached to the information processing device at such a position that the camera can capture an image of the inside of the housing through the portion of the housing.

The information processing device includes a marker recognition unit and a process performing unit. The marker recognition unit recognizes the predetermined marker in the camera image obtained by the camera. The process performing unit performs a predetermined process based on the marker recognition result.

(16)

The process performing unit may perform a different process depending on a type of the marker recognized.

Note that when a predetermined marker is recognized, the process performing unit may launch a predetermined application program with which the accessory can be used. If a predetermined marker stops being recognized while a predetermined application with which the accessory can be used is running on the information processing device, the process performing unit may halt the execution of the application program. If a predetermined marker is recognized, the process performing unit may perform a process of accessing a predetermined external device to obtain a predetermined application program with which the accessory can be used. If a predetermined marker is recognized, the process performing unit may perform a process of accessing an external device to obtain a predetermined web page, and displaying the web page on the display device of the information processing device.

The marker recognition unit may determine whether or not a predetermined marker has been recognized in the camera image. When it is determined that a predetermined marker has been recognized, the process performing unit may determine that the accessory has been attached to the information processing device. Note that if it is determined that a predetermined marker has been recognized, the process performing unit may determine that an authentic accessory has been attached to the information processing device and allow a predetermined information process to be performed on the information processing device.

Also disclosed herein is a portable information processing device or information processing system which has a camera and to which the accessory set forth above can be attached. Also disclosed herein is an information processing system including the accessory and the information processing device set forth above. Moreover, the present specification also discloses a storage medium storing an information processing program for instructing a computer of an information processing system to function as the various units set forth above, and an operation determination method or a process performing method to be carried out on the information processing system set forth above.

With the accessory, the information processing system, the information processing device, the storage medium storing an information processing program, the operation determination method, and the process performing method set forth above, it is possible to provide an accessory with a simple configuration.

These and other objects, features, aspects and advantages will become more apparent from the following detailed description when taken in conjunction with the accompanying drawings.

DETAILED DESCRIPTION OF NON-LIMITING EXAMPLE EMBODIMENTS

An accessory, an information processing system, an information processing device, an information processing program, an operation determination method and a process performing method of the present embodiment will now be described. The information processing system of the present embodiment includes a portable device, which is an example of the information processing device, and an operation device, which is an example of the accessory (see FIG. 8). In the present embodiment, the operation device can be attached to the portable device, and the operation device can be used for performing an operation on the portable device. That is, it is possible, with the operation device, to add an operation function to the portable device.

[1. Configuration of Portable Device]

Figure 1:
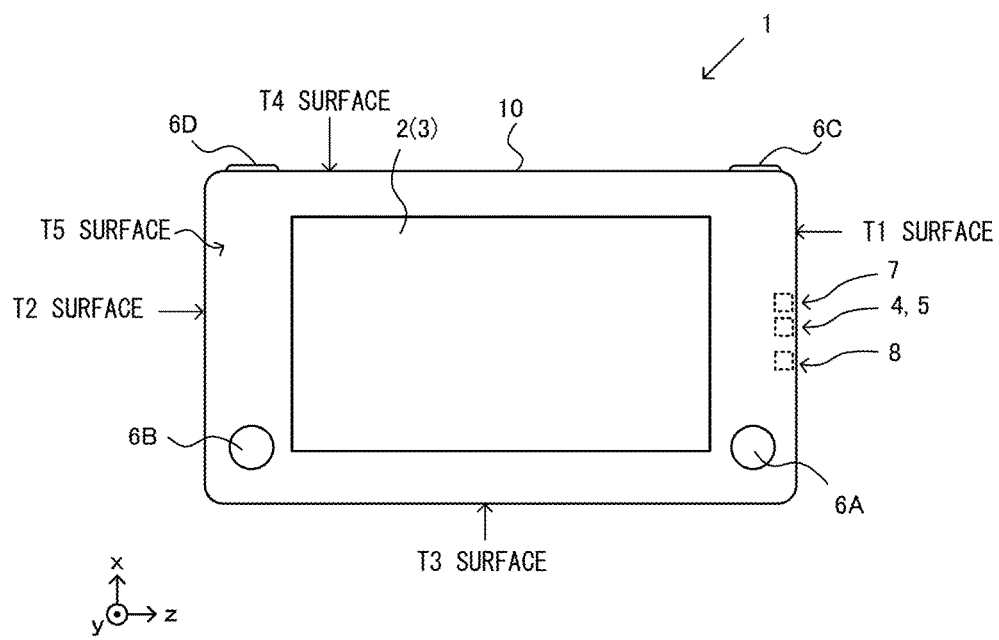
FIG. 1 is a front view showing a non-limiting example portable device of the present embodiment.
Figure 2:
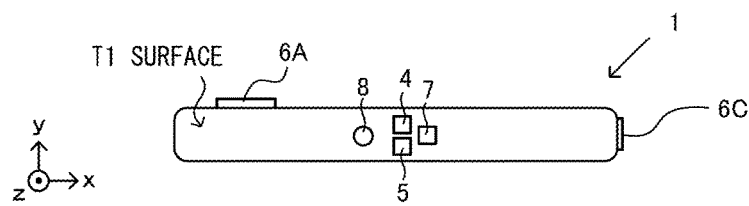
FIG. 2 is a right side view showing a non-limiting example portable device.
Figure 3:
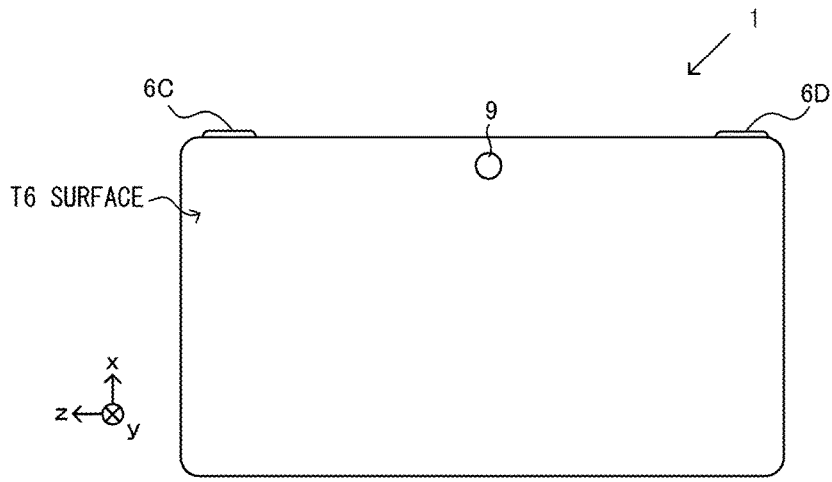
FIG. 3 is a back view showing a non-limiting example portable device.

First, referring to FIG. 1 to FIG. 5, an example of a configuration of a portable device will be described. FIG. 1 is a front view showing an example of a portable device of the present embodiment. FIG. 2 is a right side view showing an example of a portable device. FIG. 3 is a back view showing an example of a portable device. In the present embodiment, a portable device 1 is a portable information processing device that can be held in a hand and operated by a user. For example, the portable device 1 may be a hand-held device such as a portable game device, a portable telephone, a smartphone, a tablet terminal, a camera, a game controller or a mouse, or may be a terminal that can be worn by a user such as a wristwatch-shaped terminal.

As shown in FIG. 1, the portable device 1 includes a display 2, a touch panel 3, an infrared camera 4, a distance measuring sensor 5, input buttons 6 (6A to 6D), an illuminating section 7 and a projector 8, which are accommodated in a housing 10. The housing 10 (the portable device 1) has a plate-like shape, and is sized so that it can be held by a user with one hand or both hands.

For example, the display 2 may be a liquid crystal display device, an organic EL display device, or the like, or may by any other suitable display device. The screen of the display 2 is provided so as to be exposed on the front surface (T5 surface) of the housing 10. The touch panel 3 is provided on the screen of the display 2 for detecting the position at which the screen has been touched by a user. The touch panel 3 may be a touch panel capable of one-point detection or a touch panel capable of multi-point detection, and may be of any suitable type such as capacitive or resistive, for example.

The input buttons 6A to 6D each receive an input (pressing of a button) by a user. The input buttons 6A to 6D are each provided at such a position that it can be reached by a finger of a user when the user holds the opposing sides of the portable device 1. Specifically, the input buttons 6A and 6C are located so that they can be reached by fingers of the right hand when the user holds the portable device 1 with the right hand, wherein the input button 6A is provided at such a position that it can be reached by the thumb of the right hand, and the input button 6C is provided at such a position that it can be reached by the index finger or the middle finger of the right hand. The input buttons 6B and 6D are located so that they can be reached by fingers of the left hand when the user holds the portable device 1 with the left hand, wherein the input button 6B is provided at such a position that it can be reached by the thumb of the left hand, and the input button 6D is provided at such a position that it can be reached by the index finger or the middle finger of the left hand. As shown in FIG. 1, the input buttons 6A and 6B are provided on the front surface (T5 surface) of the housing 10, and the input buttons 6C and 6D are provided on the top surface (T4 surface) of the housing 10. Note that input sections for receiving inputs from a user may include, in addition to the input buttons 6A to 6D, a cross-shaped key, an analog stick, or the like, for direction inputs.

The infrared camera 4 includes a lens, and a sensor capable of sensing light (infrared rays; specifically, near infrared rays). The sensor of the infrared camera 4 is an image sensor in which elements capable of sensing infrared rays are arranged in a matrix, and the elements of the image sensor receive and convert infrared rays into electric signals, outputting a two-dimensional infrared image.

The distance measuring sensor 5 emits light (e.g., infrared light) from a light source provided in the distance measuring sensor 5 and receives the light having been reflected off an object by means of a light-receiving element, thereby measuring the distance to the object. The distance measuring sensor 5 may be of any type, including a triangulation type and a TOF (Time Of Flight) type. The light source of the distance measuring sensor 5 may be an LED, a laser diode, or the like, emitting infrared light in a particular direction.

The illuminating section 7 outputs infrared rays at a predetermined time interval (e.g., an interval of 1/60 sec). The illuminating section 7 outputs infrared rays in sync with the timing with which the infrared camera 4 captures images. The illuminating section 7 outputs infrared rays onto a predetermined range in the right side surface direction of the portable device 1. Infrared rays output by an illuminating section 7 are reflected by an object, and the reflected infrared rays are received by the infrared camera 4, thereby obtaining an image of the infrared rays. Note that the illuminating section 7 may be used for capturing an infrared image by the infrared camera 4 and for measuring the distance by the distance measuring sensor 5. That is, the infrared light from the illuminating section 7 may be used both for capturing an image by means of the infrared camera 4 and for measuring the distance by means of the distance measuring sensor 5.

The projector 8 includes a light source for emitting visible light, and projects text, an image, etc., onto a projection plane (a screen or the hand of a user as will be described later) by using light from the light source.

The infrared camera 4, the distance measuring sensor 5, the illuminating section 7 and the projector 8 are provided on a side surface of the housing 10 (e.g., the right side surface: T1 surface). Specifically, the image-capturing direction (optical axis) of the infrared camera 4 is oriented vertical to the right side surface. The detecting direction of the distance measuring sensor 5 and the direction in which the projector 8 outputs light are also vertical to the right side surface. That is, when a user holds the portable device 1 with the left hand, the infrared camera 4 captures an image of the space in the right side surface direction of the portable device 1, and the distance measuring sensor 5 measures the distance to an object existing in the space in the right side surface direction of the portable device 1. The projector 8 projects an image, or the like, by outputting visible light in the same direction as the infrared camera 4 and the distance measuring sensor 5.

An outside camera 9 is provided on the back surface (T6 surface) of the portable device 1 (FIG. 3). The outside camera 9 is typically capable of capturing an image in the direction vertical to the image-capturing direction of the infrared camera 4, and is capable of capturing an image in the direction vertical to the back surface. The outside camera 9 includes a lens, and an image sensor capable of sensing visible light. The outside camera 9 captures an image of the space in the back surface direction, obtaining a color image (RGB image). Note that a camera may be provided on the front surface in addition to the outside camera 9 on the back surface, or a camera may be provided on the front surface (the surface on which the screen of the display 2 is provided) without providing the outside camera 9 on the back surface.

Figure 4:
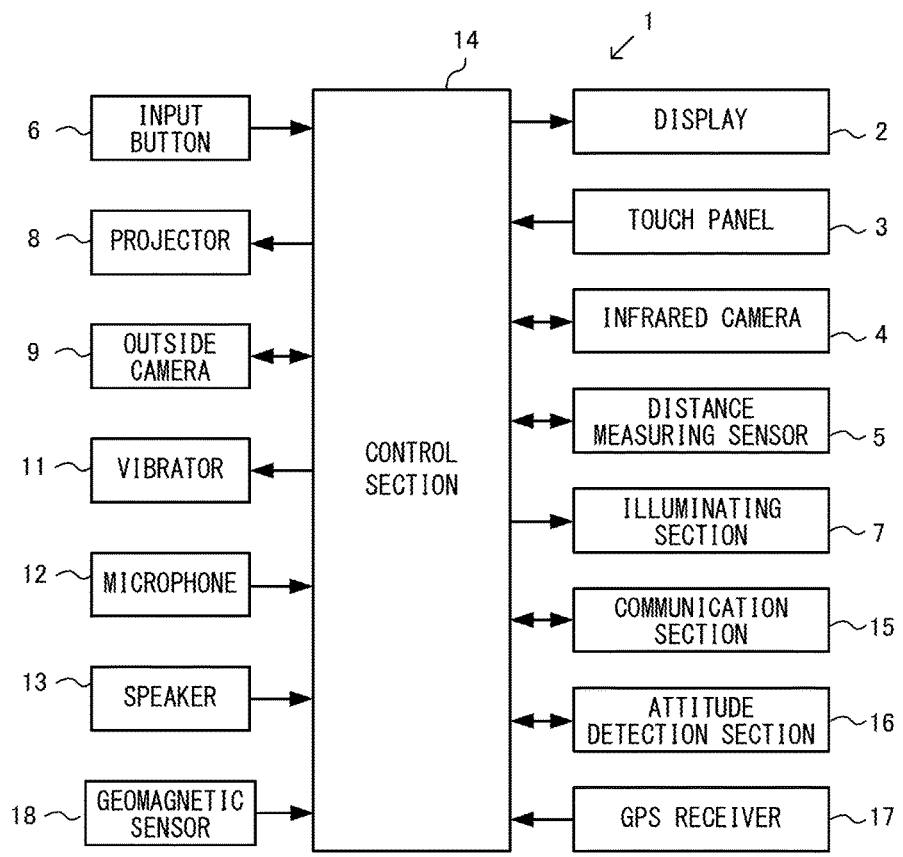
FIG. 4 is a block diagram showing an internal configuration of a non-limiting example portable device.

FIG. 4 is a block diagram showing an example of an internal configuration of the portable device 1. As shown in FIG. 4, in addition to the various sections mentioned above, the portable device 1 includes a vibrator 11, a microphone 12, a speaker 13, a control section 14, a communication section 15, an attitude detection section 16, a GPS receiver 17 and a geomagnetic sensor 18. The portable device 1 also includes a battery (not shown), and receives power supply from the battery. These sections are accommodated in the housing 10.

The control section 14 is connected to, and controls, various sections including the display 2, the touch panel 3, the infrared camera 4, the distance measuring sensor 5, the input button 6, the illuminating section 7, the projector 8, the vibrator 11, the microphone 12, the speaker 13, the communication section 15, the attitude detection section 16, the GPS receiver 17 and the geomagnetic sensor 18.

Specifically, a control section 14 includes a CPU, a memory, etc., for performing a predetermined process based on a predetermined program (e.g., an application program for performing game processes, image processes, and various arithmetic operations) stored in a storage device (not shown) (e.g., a non-volatile memory or a hard disk) provided in the portable device 1. For example, the control section 14 may obtain and analyze an image from the infrared camera 4, calculate the distance to an object based on the signal from the distance measuring sensor 5, or perform a process in accordance with input signals from the touch panel 3 and the input button 6. Then, the control section 14 generates an image based on the results of the predetermined process, and outputs the image on the display 2. Note that the program for performing the predetermined process may be downloaded from outside via the communication section 15.

The vibrator 11 operates based on an instruction from the control section 14 and vibrates the entire portable device 1. The vibrator 11 is provided at a predetermined position such that vibrations are easily transmitted to the hand of a user (e.g., in the central portion, or at a position shifted left or right therefrom, inside the housing 10).

The microphone 12 and the speaker 13 are used for inputting/outputting sounds. The communication section 15 is used for communicating with other devices by a predetermined communication scheme (e.g., wireless LAN, etc.). The attitude detection section 16 is, for example, an acceleration sensor or an angular velocity sensor for detecting the attitude of the portable device 1.

The GPS receiver 17 receives a signal from a GPS (Global Positioning System) satellite, and the portable device 1 can calculate the position of the portable device 1 itself by receiving the signal. For example, when a predetermined operation is performed at a particular position (e.g., a gesture input or a button input using the infrared camera 4, shaking the portable device 1, etc., to be described later), the portable device 1 may display an object associated with the particular position. For example, where a game is played on the portable device 1, and the portable device 1 is at a particular position, an object associated with the particular position may appear in the game.

The geomagnetic sensor 18 is a sensor capable of detecting the direction and the magnitude of a magnetic field. For example, based on the detection result of the geomagnetic sensor 18, the portable device 1 may determine whether it is facing a particular azimuthal direction, and the portable device 1 may display an object when a predetermined operation (e.g., a gesture input mentioned above) in a particular azimuthal direction. For example, where a game is played on the portable device 1, an object associated with a particular azimuthal direction may appear in the game. The portable device 1 may combine together GPS information obtained by the GPS receiver 17 and azimuthal direction information obtained by the geomagnetic sensor. For example, if the portable device 1 is at a particular position and is facing a particular azimuthal direction, the portable device 1 may display an object associated with the particular position and the particular azimuthal direction, or such an object may appear in the game.

Figure 5:
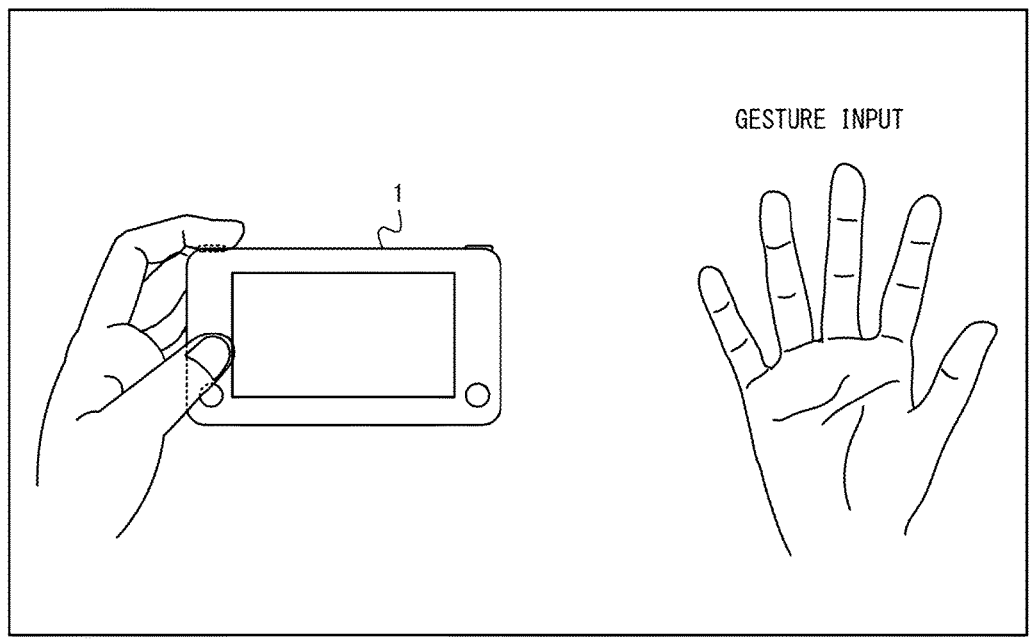
FIG. 5 shows how a non-limiting example portable device is used.

FIG. 5 shows an example of how the portable device 1 is used. As shown in FIG. 5, a user can hold the portable device 1 with one hand and make gesture inputs using the other hand. Note that a gesture input may be any input made with an operation object that is operated (moved) by a user. An operation object may be the body of the user (which may be the whole body or a part of the body such as a hand or the face), an object held by the user, or may be both the body and an object. The portable device 1 may recognize the shape of the operation object as a gesture input, may recognize the movement of the operation object as a gesture input, or may recognize a combination of the shape and the movement as a gesture input. For example, a user may make a gesture input by using the shape, the movement, the position (with respect to the portable device 1), the orientation (attitude), etc., of the hand.

In the present embodiment, the portable device 1 captures an image (infrared image) by means of the infrared camera 4, and determines a gesture input based on the captured image (referred to also as the camera image). Specifically, when a captured image is obtained from the infrared camera 4, the portable device 1 calculates the shape, the position, and/or the orientation (attitude) of the object based on the captured image obtained. Note that based on a plurality of captured images obtained through repetition, the portable device 1 may calculate the movement of the object (the change of shape, the moving direction, the moving speed, etc.). The portable device 1 determines a gesture input based on these calculation results.

[2. Configuration of Operation Device]

Figure 6:
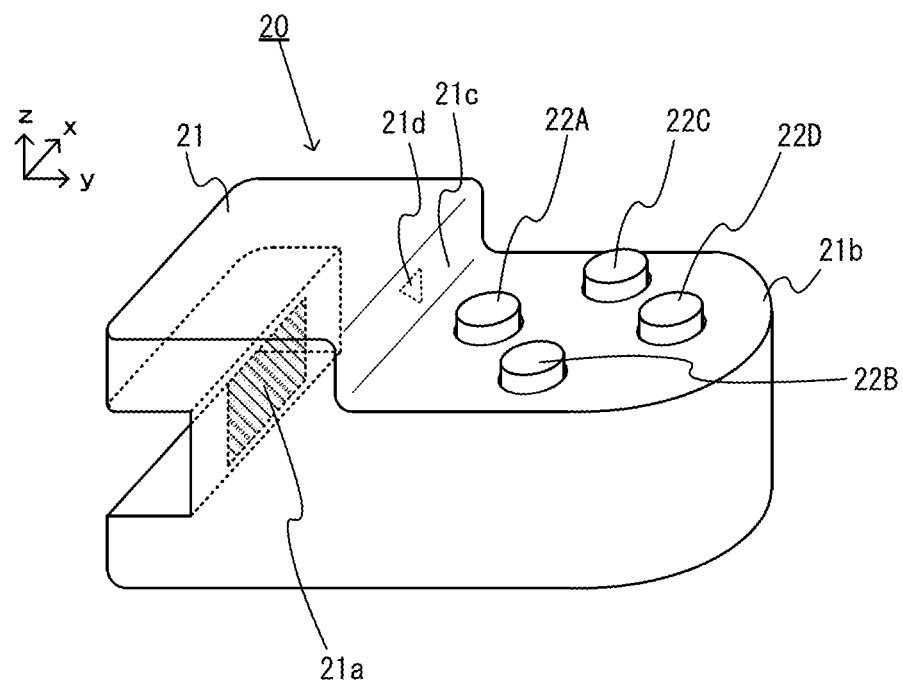
FIG. 6 shows the external appearance of a non-limiting example operation device.

Next, referring to FIG. 6 and FIG. 7, an example configuration of an operation device will be described. FIG. 6 shows the external appearance of an example operation device. In the present embodiment, an operation device 20 can be attached/detached to/from the portable device 1, and includes operation sections (buttons 22A to 22D). That is, the operation device 20 is an accessory that adds an operation function to the portable device 1. The portable device 1 detects an operation performed on the operation device 20, and performs a process in accordance with the detected operation. Here, the operation is detected by using the infrared camera 4, the details of which will be described later. Therefore, the operation device 20 needs no electrical configuration, such as an electronic circuit, for detecting the operation and for transmitting the detection result to the portable device 1. Therefore, according to the present embodiment, it is possible to simplify the configuration of the operation device 20. The details will now be described.

As shown in FIG. 6, the operation device 20 includes a housing 21. The housing 21 is attached to the portable device 1 in such a manner that the housing 21 can be attached/detached to/from the portable device 1. That is, the operation device 20 includes a connecting portion (not shown) for connecting the housing 21 (the operation device 20) with the portable device 1. Note that the connecting portion may have any configuration, and may be a conventional mechanism.

For example, the connecting portion may include a claw to be engaged with a predetermined portion of the portable device 1 (e.g., a protruding portion formed along the periphery of the front surface (T5 surface)), and the housing 21 may be secured on the portable device 1 with the claw engaged with the predetermined portion. For example, the connecting portion may be such a mechanism that the housing 21 is secured on the portable device 1 with a portion of the portable device 1 being clamped in the up-down direction. The connecting portion may be connected to the portable device 1 magnetically. For example, the operation device 20 may be connected to the portable device 1 by virtue of the attraction between a magnet of the portable device 1 and a magnet of the connecting portion. That is, "to attach" as used herein means that the positional relationship between the two members is somewhat fixed, and the connection between the two members is not limited to a mechanical connection, but may include a connection between the two members by virtue of a magnetic force. In other embodiments, the portable device 1 and the operation device 20 may be connected together via a connection member. That is, as the portable device 1 and the connection member are connected together and the connection member and the operation device 20 are connected together, the positional relationship between the portable device 1 and the operation device 20 may be fixed.

In the present embodiment, the housing 21 (the operation device 20) is attached to the portable device 1 so fixedly that the attachment cannot be removed by up to a certain amount of force. The housing 21 (the operation device 20) is detached from the portable device 1 when a stronger force is applied thereto.

As shown in FIG. 6, a hole (opening portion) 21a is formed in the housing 21. Thus, the operation device 20 is configured so that the inside (the inner side) of the housing 21 can be seen through the hole 21a. Note that the housing 21 may have any configuration such that the inside of the housing 21 is visible from the outside through a predetermined portion of the housing 21. For example, in other embodiments, the predetermined portion may be formed by a transparent member instead of the provision of the hole 21a in the predetermined portion.

Here, in the present embodiment, a reference marker 21d is provided on a wall surface on the inside of the housing 21 (the inner wall surface of a surface 21c in FIG. 6). Movable portions 23A to 23D to be described later are provided on the inside of the housing 21 (see FIG. 7). The hole 21a is formed at such a position that the movable portions 23A to 23D and the reference marker 21d are visible when one sees the inside of the housing 21 from the outside of the housing 21 through the hole 21a.

Note that the reference marker 21d is used as a reference for calculating the positions of the movable portions 23A to 23D, the details of which will be described later. The reference marker 21d is formed at a predetermined position on the inside of the housing 21. The shape of the reference marker 21d is predetermined. The reference marker 21d is of a material (color) such that the infrared camera 4 can distinguish the reference marker 21d from other portions (other than the reference marker 21d) of the wall surface on the inside of the housing 21. The reference marker 21d may be a design pattern provided on the inner surface of the housing 21 or a member placed on the inner surface of the housing 21.

The operation device 20 includes operation buttons 22A to 22D, which are example operation sections. Note that where the operation buttons 22A to 22D are not distinguished from each other, the designation "operation button 22" may be used to refer to any one of the operation buttons 22A to 22D. The operation buttons 22A to 22D are provided so as to be exposed on a predetermined surface of the housing 21 (a button surface 21b in FIG. 6). The operation buttons 22A to 22D are projecting from the button surface 21b, and can be pressed toward the inside of the housing 21. Specifically, each operation button 22 is supported, in the housing 21, with respect to the housing 21 while being urged upwardly by a biasing member (e.g., an elastic body such as a spring) (not shown). The operation button 22 moves downward by being operated (pressed) by the user.

Figure 7:
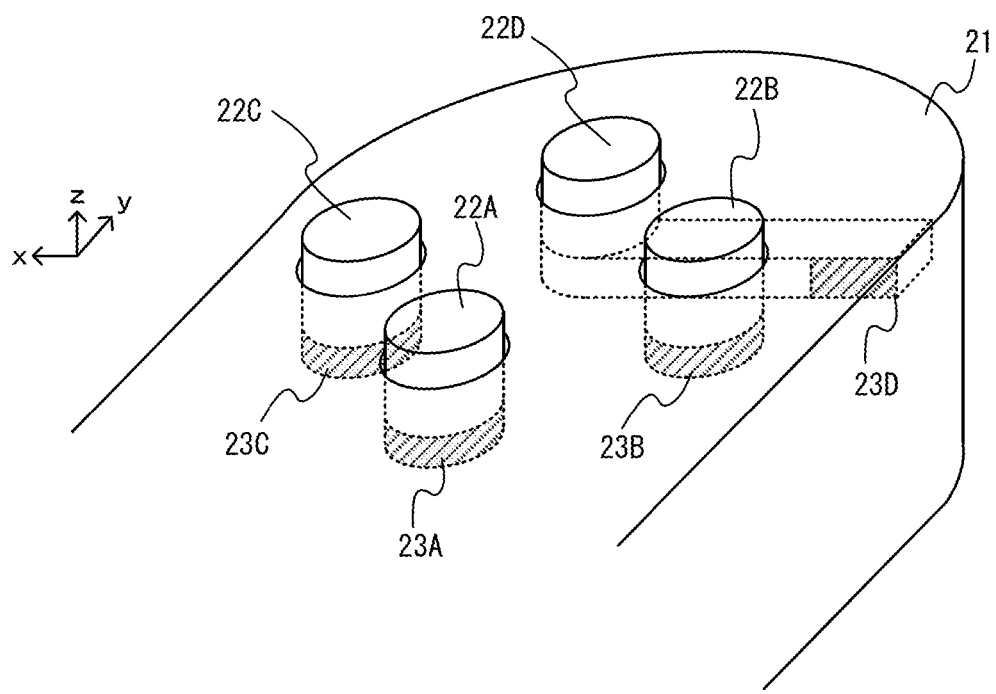
FIG. 7 shows an example internal configuration of the operation device shown in FIG. 6.

FIG. 7 shows an example internal configuration of the operation device shown in FIG. 6. Note that FIG. 7 shows only a part of the configuration inside the housing 21. As shown in FIG. 7, the operation device 20 includes the movable portions 23A to 23D provided inside the housing 21. Note that where the movable portions 23A to 23D are not distinguished from each other, the designation "movable portion 23" may be used to refer to any of the movable portions 23A to 23D.

As shown in FIG. 7, the movable portions 23A to 23D are connected to the operation buttons 22A to 22D, respectively. That is, the movable portion 23A is connected to the operation button 22A, the movable portion 23B to the operation button 22B, the movable portion 23C to the operation button 22C, and the movable portion 23D to the operation button 22D. The movable portion 23 moves (downward in the present embodiment) in response to an operation on the operation button 22 connected thereto. In the present embodiment, each operation button and a movable portion connected thereto are configured as an integral part. Note however that the movable portion may be configured so as to be moved in accordance with the movement of the operation button, and an operation button and a movable portion connected thereto may be separate parts in other embodiments.

In the present embodiment, at least a portion of the movable portion 23 (the hatched area shown in FIG. 7: hereinafter referred to as a "recognition portion") is of a material (color) such that the infrared camera 4 can distinguish this portion from other portions (other than the portion of the reference marker 21d) of the wall surface on the inside of the housing 21. The recognition portion may be of a retroreflective material, for example. Then, the infrared light from the illuminating section 7 is reflected more toward the infrared camera 4, making it easier for the infrared camera 4 to recognize the recognition portion. This also makes it easier for the infrared camera 4 to recognize a recognition portion that is located away from the infrared camera 4. The movable portion 23 is connected to the lower portion of the operation button 22. Here, for each of the movable portions 23A to 23C, the recognition portion is placed under (directly below) the corresponding operation button 22. For the movable portion 23D, on the other hand, the recognition portion is displaced from a position that is directly below the corresponding operation button 22D (see FIG. 7). That is, the recognition portions of the movable portions 23A to 23D are arranged so that the recognition portions are visible through the hole 21a.

Note that the shape and the size of the housing 21, and the shape, the size and the number of the operation button 22 and the movable portions 23 are not limited to any particular shape, size and number. The shape, the size and the number of these members shown in FIG. 6 and FIG. 7 are illustrative, and the operation device in other embodiments may have a different configuration from that shown in FIG. 6 and FIG. 7.

[3. Attachment of Operation Device to Portable Device]

Next, referring to FIG. 8 and FIG. 9, the attachment of the operation device 20 to the portable device 1 will be described. In the present embodiment, the operation device 20 can be attached at least to a side surface (more specifically, the T1 surface) of the portable device 1.

Figure 8:
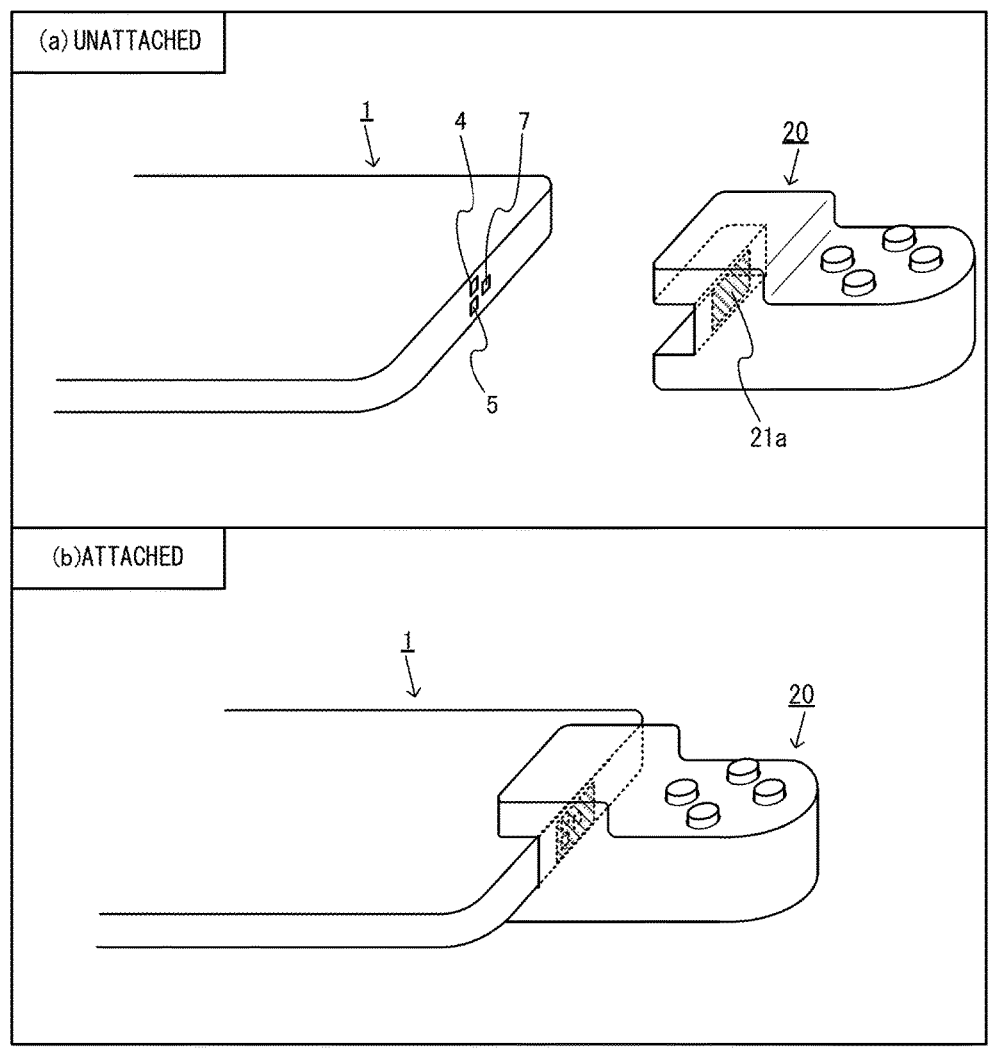
FIG. 8 shows an example operation device before and after it is attached to a portable device.

FIG. 8 shows an example of the operation device 20 before and after it is attached to the portable device 1. As shown in FIG. 8(b), the operation device 20 is attached to the portable device 1 at such a position that the hole 21a faces the infrared camera 4 (and the illuminating section 7). Therefore, with the operation device 20 attached to the portable device 1, the infrared camera 4 can capture an image of the inside of the housing 21. In this position, the illuminating section 7 can output infrared light into the inside of the housing 21. In the present embodiment, since infrared light is output by the illuminating section 7 into the inside of the housing 21, it is possible with the infrared camera 4 to capture an image of the inside of the housing 21 even if the ambient light does not enter the inside of the housing 21. Note that in the present embodiment, the housing 21 is of a material that does not allow light (at least infrared light) to pass therethrough, except for the hole 21a (or a portion of a transparent member provided instead of the hole 21a).

As shown in FIG. 8(b), with the operation device 20 attached to the portable device 1, the hole 21a is covered by the operation device 20. That is, the connecting portion connects the housing 21 with the portable device 1 so that the hole 21a of the housing 21 is covered by the portable device 1 to which the operation device 20 is attached. Then, since the infrared camera 4 does not (substantially) detect ambient light, it is possible to reduce the possibility of false recognition due to ambient light (false recognition of the reference marker 21d and/or the movable portion 23). That is, it is possible to more accurately recognize the inside of the housing 21 based on the captured image obtained by the infrared camera 4.

Figure 9:
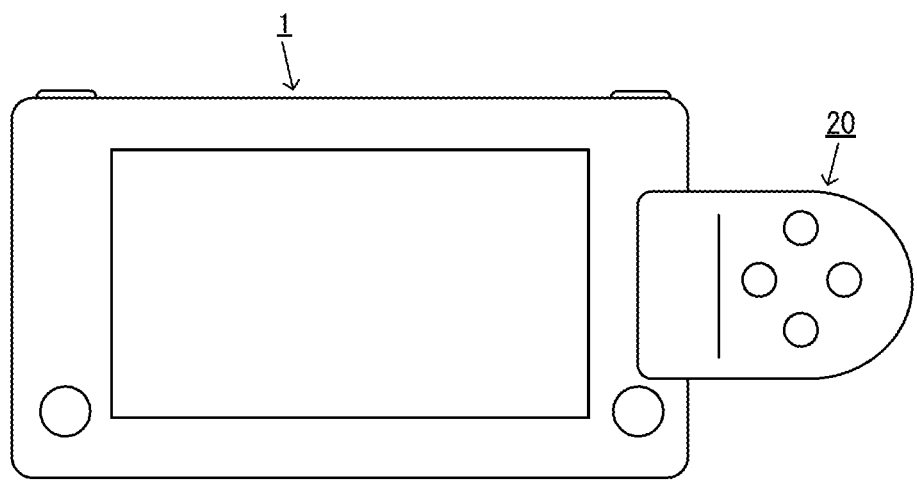
FIG. 9 shows an example configuration where an operation device is attached to a portable device.

FIG. 9 shows an example configuration where the operation device 20 is attached to the portable device 1. When the operation device 20 is attached to the portable device 1, the user may grip a left-side portion of the portable device 1 with the left hand and grip the operation device 20 with the right hand. Then, the user can operate the operation buttons 22A to 22D of the operation device 20. Note that the operation device 20 may be attached to the portable device 1 so that the button surface 21b of the operation device 20 is located generally on the same plane (i.e., generally at the same position with respect to the z-axis direction) as the front surface (T5 surface) of the portable device 1. Then, the user can operate the portable device 1 and the operation device 20 while having both hands at the same position with respect to the z-axis direction, thus making it easier to perform operations.

Note that in other embodiments, the operation device 20 may be configured so that the operation device 20 cannot be attached to the portable device 1 at such a position that the hole 21a is not facing the infrared camera 4 and the illuminating section 7 (i.e., at such a position that the infrared camera 4 cannot capture an image of the inside of the housing 21, and/or the illuminating section 7 cannot output light into the inside of the housing 21). For example, the housing 21 may include a protrusion that fits into a depression on the portable device 1 when the housing 21 is placed at an appropriate position (a position such that the hole 21a faces the infrared camera 4 and the illuminating section 7) (the protrusion of the housing 21 and the depression of the portable device 1 may be reversed). Then, the alignment can be made with the protrusion of the housing 21 and the depression of the portable device 1, and it is therefore possible to attach the operation device 20 to the portable device 1 at an appropriate position. Note that in other embodiments, the operation device 20 may be allowed to be attached to other positions of the portable device 1. For example, the operation device 20 may be allowed to be attached to the portable device 1 at such a position that the hole 21a faces the outside camera 9.

[4. Determining Operation Performed on Operation Device]

Next, referring to FIG. 10 to FIG. 12, how an operation performed on the operation device 20 is determined by the portable device 1 will be described. When the operation device 20 is attached to the portable device 1, the infrared camera 4 captures an image of the movable portions 23A to 23D inside the housing 21 through the hole 21a. Now, the movable portion 23 moves in response to an operation performed on the corresponding operation button 22. Therefore, by calculating the position of the movable portion 23 in the captured image, it is possible to determine that the operation button 22 is operated. The details of the method for determining an operation will now be described.

Figure 10:
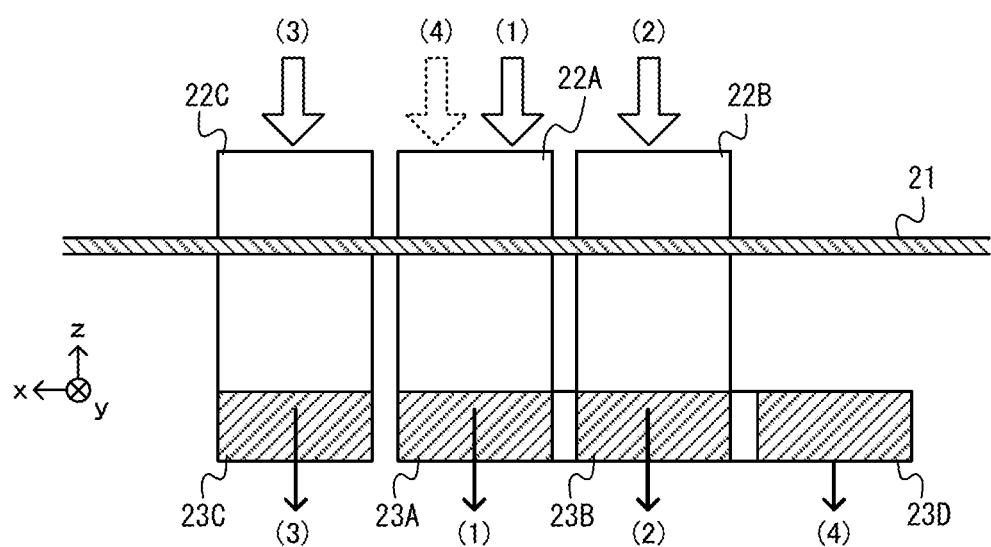
FIG. 10 shows an example of how operation buttons and movable portions move.

FIG. 10 shows an example of how the operation button 22 and the movable portion 23 move. FIG. 10 is a diagram showing the operation buttons 22A to 22D and the movable portions 23A to 23D as seen from the image-capturing direction of the infrared camera 4 (i.e., the direction of viewing the inside of the housing 21 from the outside of the housing 21 through the hole 21a). In the present embodiment, when the operation button 22A is pressed, the movable portion 23A moves downward (the negative z-axis direction) ((1) shown in FIG. 10). Similarly, when the operation button 22B is pressed, the movable portion 23B moves downward ((2) shown in FIG. 10); when the operation button 22C is pressed, the movable portion 23C moves downward ((3) shown in FIG. 10); and when the operation button 22D is pressed, the movable portion 23D moves downward ((4) shown in FIG. 10).

Note that in the present embodiment, the operation buttons 22A and 22D are located substantially at the same position as seen from the image-capturing direction. Therefore, when viewed from the image-capturing direction, the operation button 22D itself is substantially invisible by being blocked by the operation button 22A. Thus, in the present embodiment, the movable portion 23D corresponding to the operation button 22D is offset from any of the other movable portions 23A to 23C (as viewed from the image-capturing direction). That is, the movable portions 23A to 23D are located so that they are visible as viewed from the image-capturing direction, as shown in FIG. 10. Thus, the movement of the movable portion 23D following the pressing of the operation button 22D can be recognized when viewed from the image-capturing direction.

Figure 11:
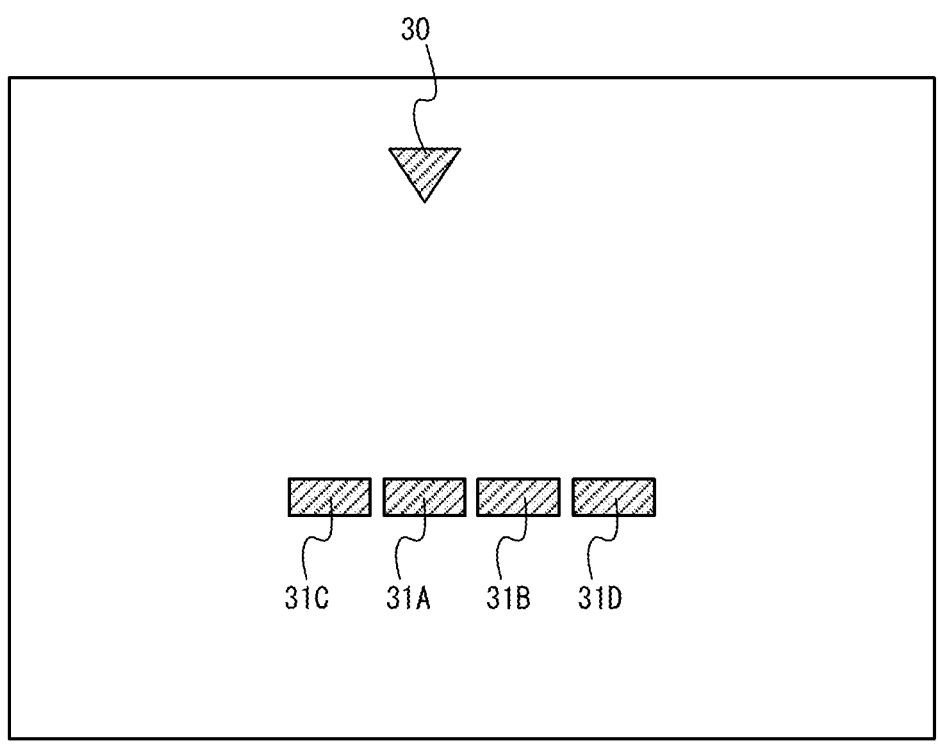
FIG. 11 shows an example captured image obtained by an infrared camera.

FIG. 11 shows an example captured image obtained by the infrared camera 4. The captured image shown in FIG. 11 is an image to be obtained when the operation buttons 22A to 22D are not operated (in the unoperated state). As shown in FIG. 11, the captured image includes an image (reference marker image) 30 of the reference marker 21d and images (movable portion images) 31A to 31D of movable portions 23A to 23D. Thus, the reference marker 21d and the movable portions 23A to 23D are placed at such positions as to be included in the image-capturing range of the infrared camera 4, with the operation device 20 attached to the portable device 1. Thus, with the operation device 20 connected to the portable device 1, the infrared camera 4 can capture an image of the reference marker 21d and the movable portions 23A to 23D inside the housing 21 through the hole 21a of the housing 21. That is, the following members (a) to (d) are placed at such positions that the infrared camera 4 can capture an image of the reference marker 21d and the movable portions 23A to 23D in such a state as described above:
  (a) infrared camera 4 of portable device 1;
  (b) hole 21a of housing 21 of controller device 20;
  (c) reference marker 21d of controller device 20; and
  (d) movable portions 23A to 23D of controller device 20.

Figure 12:
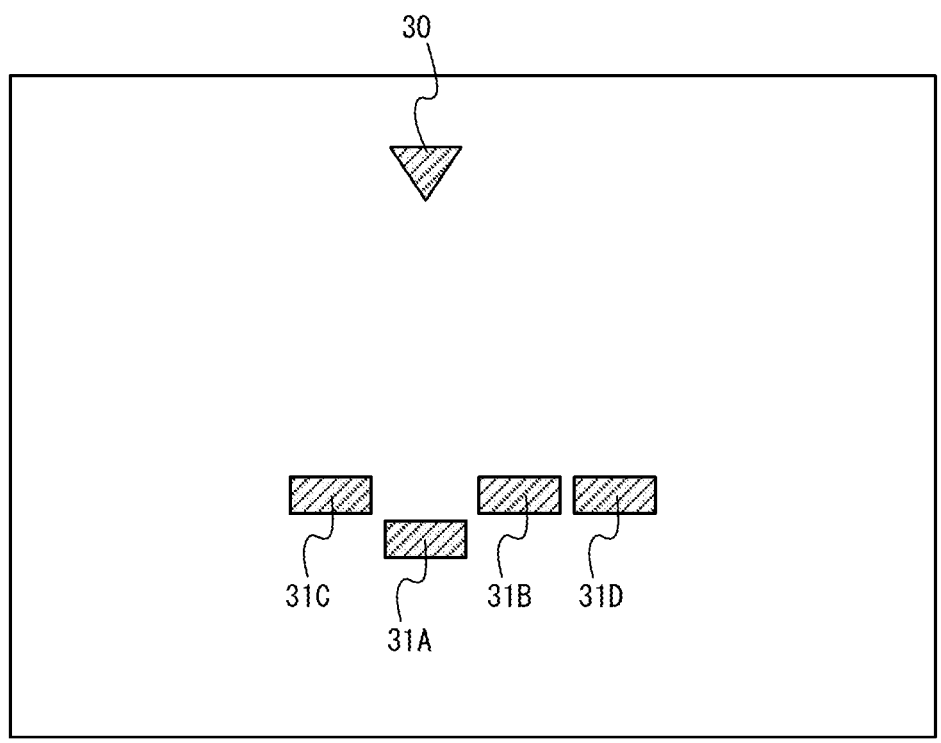
FIG. 12 shows another example captured image obtained by an infrared camera.

FIG. 12 shows another example captured image obtained by the infrared camera 4. The captured image shown in FIG. 12 is an image obtained while the operation button 22A is operated (depressed). When the operation button 22A is operated, the movable portion 23A moves downward. Therefore, in the captured image, the movable portion image 31A is located below its position in the unoperated state, as shown in FIG. 12. Thus, when an operation button 22 is operated, the position of the corresponding movable portion image 31 changes from its position in the unoperated state. Therefore, based on the position of the movable portion image 31 in the captured image, it is possible to determine whether the operation button 22 corresponding to the movable portion image 31 is operated.

Specifically, the portable device 1 calculates the position of the reference marker image 30 from the captured image. Any method may be used for recognizing the reference marker image 30 in the captured image. For example, the portable device 1 identifies the reference marker image 30 by performing an image recognition process using pattern matching on the captured image. Moreover, the portable device 1 calculates the position of the identified reference marker image 30 (the position on the captured image). In the present embodiment, the calculated position of the reference marker image 30 is used as the reference position.

The portable device 1 calculates the position of each of the movable portion images 31A to 31D from the captured image. Any method may be used for recognizing the movable portion image in the captured image. The portable device 1 identifies each of the movable portion images 31A to 31D by performing an image recognition process using pattern matching, for example. Moreover, the portable device 1 calculates the position of each of the identified movable portion images 31A to 31D (the position on the captured image).

Note that the movable portion images 31A to 31D have the same shape in the present embodiment, and it is therefore difficult to distinguish the movable portion images 31A to 31D from one another based on the shape. Note however that the positional relationship between the movable portion images 31A to 31D (i.e., the order of arrangement from the left, i.e., the movable portion image 31C, the movable portion image 31A, the movable portion image 31B and the movable portion image 31D) is predetermined and known. The positional relationship between each of the movable portion images 31A to 31D and the reference marker image 30 is predetermined. Therefore, the portable device 1 can identify each of the movable portion images 31A to 31D by using either one of these positional relationships. Note that in other embodiments, the recognition portions of the movable portions may have different shapes from each other. Then, it is possible to identify each movable portion image based on the shape of the movable portion image.

The portable device 1 determines whether or not the operation buttons 22A to 22D have been operated based on the calculated positions of the movable portion images 31A to 31D. Now, if an operation button 22 is operated, the distance from the reference marker image 30 to the movable portion image (the movable portion image corresponding to the operation button 22) becomes longer than that in the unoperated state. That is, it is possible to determine whether or not each of the operation buttons 22A to 22D is operated (pressed) by determining whether or not the distance between each of the movable portion images 31A to 31D and the reference position is longer than that in the unoperated state.

Thus, in the present embodiment, the portable device 1 determines whether or not the distance from the reference position (the position of the reference marker 21d) to each of the movable portion images 31A to 31D is greater than or equal to a predetermined distance. Here, the predetermined distance is set for each of the movable portion images 31A to 31D, and is set to be longer than the distance from the reference position to the movable portion image in the unoperated state. If the distance from the reference position to the movable portion image is greater than or equal to the predetermined distance, the portable device 1 determines that the operation button 22 corresponding to the movable portion image is operated. On the other hand, if the distance from the reference position to the movable portion image is shorter than the predetermined distance, the portable device 1 determines that the operation button 22 corresponding to the movable portion image is not operated.

As described above, in the present embodiment, whether or not an operation button is operated is determined based on the positional relationship between the reference position and the position of the movable portion image. Here, the specific method of determination may be any method, and the determination may be done by any other method. For example, in other embodiments, the determination may be done based only on the position of the movable portion image (without using the reference position). Specifically, the portable device 1 may pre-store, as a registered position, the position of the movable portion image in the unoperated state, and may perform the determination based on whether or not the position of the movable portion image in the captured image obtained is displaced from the registered position by a predetermined distance or more.

Note that the positional relationship between the portable device 1 and the operation device 20 attached thereto is not always constant, but may vary to some degree each time the operation device 20 is attached or between different operation devices. Therefore, the position of the movable portion image on the captured image is not always constant even in the unoperated state, but may vary each time the operation device 20 is attached or between different operation devices. Therefore, with the method for performing the determination based only on the position of the movable portion image, there is a possibility that whether or not an operation button is operated cannot be determined accurately because the pre-stored registered position is not correct. In contrast, the determination can be done accurately by using the method for performing the determination based on the positional relationship between the reference position and the position of the movable portion image as in the present embodiment.

Note that in other embodiments, the portable device 1 may reset (re-store) the registered position each time the operation device 20 is attached to the portable device 1, thereby performing the determination accurately. For example, when the operation device 20 is attached to the portable device 1, the portable device 1 may store the position of the movable portion image as the registered position while showing the user a message such as "Do not press buttons". Then, it is possible to store a more accurate registered position.

As described above, in the present embodiment, based on the image captured by the infrared camera 4, the portable device 1 can determine that a movable portion 23 has moved and can determine whether or not the operation button 22 is operated.

[5. Process of Portable Device]

Figure 13:
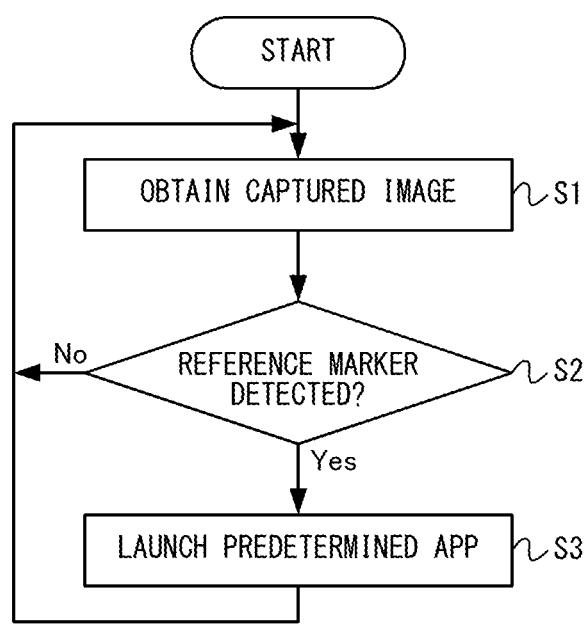
FIG. 13 is a flow chart showing an example of the flow of a process performed by a portable device.

Next, referring to FIG. 13 and FIG. 14, an example information process performed by the portable device 1 will be described. FIG. 13 is a flow chart showing an example of the flow of a process performed by the portable device 1. A series of processes shown in FIG. 13 is performed by the CPU of the control section 14 executing a predetermined program stored in the portable device 1. In the present embodiment, the predetermined program is a system program for running the OS (operating system) of the portable device 1. Note however that in other embodiments, the predetermined program may be any program, e.g., an application program to be run on the OS, for example. In the present embodiment, the series of processes shown in FIG. 13 is repeatedly performed while the power of the portable device 1 is ON. Note however that in other embodiments, the control section 14 may halt the series of processes when the portable device 1 is in a sleep state (e.g., where the display 2 is OFF), while performing the series of processes when the portable device 1 is in an active state (e.g., where the display 2 is ON). The control section 14 may activate the infrared camera 4 and the illuminating section 7 while the series of processes is performed, and deactivate the infrared camera 4 and the illuminating section 7 while the series of processes is halted.

Note that in the present application, the process in each step in the flow chart shown in the figure is merely an example, and the order of steps may be switched around, or other processes may be performed in addition to (or instead of) these steps, as long as similar results are obtained. While it is assumed herein that the processes of the steps of the flow chart are performed by the CPU of the portable device 1, processes of some of the steps of the flow chart may be performed by a processor or a dedicated circuit other than the CPU. Some of the processes performed by the portable device 1 may be performed by another information processing device capable of communicating with the portable device 1 (e.g., a server capable of communicating with the portable device 1 via a network). That is, the processes shown in FIG. 13, FIG. 14 and FIG. 19 may be performed through a cooperation of a plurality of information processing devices including the portable device 1.

In the series of processes shown in FIG. 13, first, in step S1, the control section 14 obtains, from the infrared camera 4, a captured image obtained by the infrared camera 4. That is, as the infrared camera 4 captures an image at a predetermined time interval, the control section 14 obtains the captured image from the infrared camera 4 and stores data of the captured image in a memory.

In step S2, the control section 14 determines whether or not the reference marker 21*d* is detected in the captured image obtained in step S1. That is, the control section 14 performs an image recognition process by using the method described in "[4. Determining operation performed on operation device]" above. If the reference marker image 30 is identified by the image recognition process, the control section 14 determines that the reference marker 21*d* is detected. On the other hand, if the reference marker image 30 is not identified by the image recognition process, the control section 14 determines that the reference marker 21*d* is not detected. If the determination result of step S2 is affirmative, the process of step S3 is performed. On the other hand, if the determination result of step S2 is negative, the process of step S1 is performed again. In this case, the series of processes of steps S1 and S2 is repeatedly performed until it is determined in the process of step S2 that the reference marker 21*d* is detected.

In step S3, the control section 14 launches a predetermined application (program) stored in the portable device 1. The predetermined application may be any application, and may be a game application, for example. Note that the series of processes performed in the predetermined application will be described later with reference to FIG. 14. When the execution of the predetermined application is ended, the control section 14 ends the process of step S3, and then performs again the process of step S1.

As described above, in the present embodiment, if the operation device 20 is attached to the portable device 1 while performing the series of processes of steps S1 to S3 described above, the reference marker 21*d* is detected in the process of step S2, and the application is launched automatically (irrespective of user instructions) in the process of step S3. Thus, the user can launch an application associated with the operation device 20 by attaching the operation device 20 to the portable device 1. That is, the user does not need to perform an operation of selecting and launching an application, and thus the user operation is simplified in the present embodiment.

Note that in other embodiments, there may be different types of operation devices each provided with a reference marker of a different shape and/or size, and the control section 14 may launch a different application depending on the type (the shape and/or size) of the reference marker detected in step S2 (see "(Variation in which process is varied depending on type of marker)" to be described later). That is, a different application may be launched in response to the attachment of a different operation device provided with a different reference marker.

Although not shown in FIG. 13, the control section 14 may perform various processes to be performed on the OS level. For example, the control section 14 may perform processes such as the process of displaying on the display 2 a menu image for launching an application, and the process of launching the application in response to the user specifying the application on the menu image.

Next, referring to FIG. 14, a process example to be performed by the application launched by the process of step S3 will be described. FIG. 14 is a flow chart showing an example of the flow of a process performed by an application program on the portable device 1.

Figure 14:
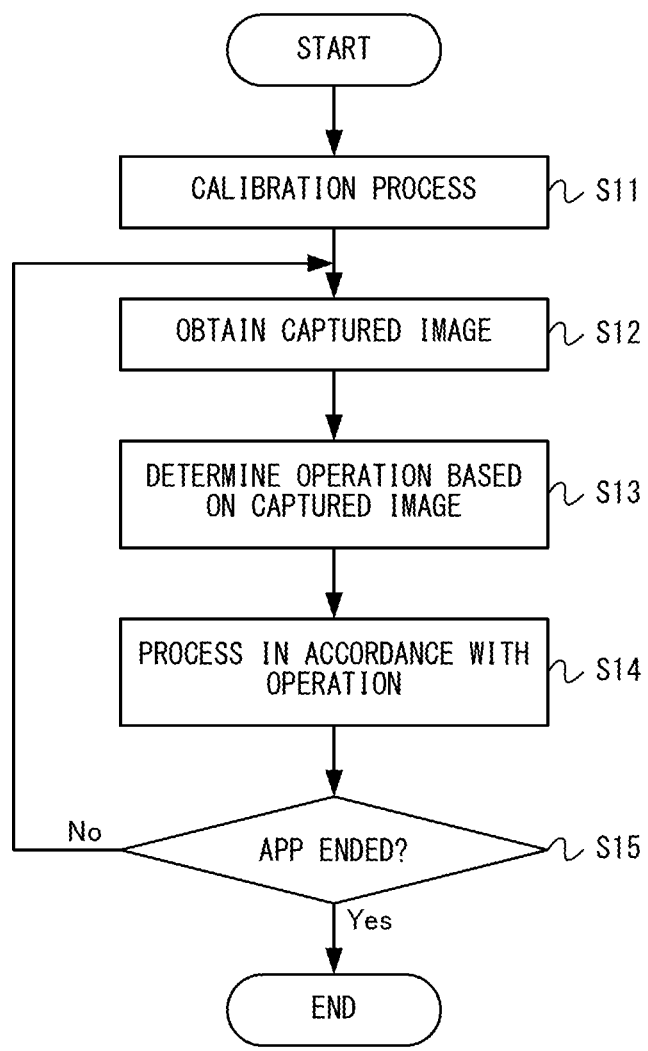
FIG. 14 is a flow chart showing an example of the flow of a process performed by an application program of a portable device.

In the series of processes shown in FIG. 14, first, in step S11, the control section 14 performs a calibration process. Specifically, the control section 14 calculates the reference position described above by the method described in "[4. Determining operation performed on operation device]" above, and stores the data of the reference position in a memory. Note that the captured image used for the calculation of the reference position may be an image obtained at an arbitrary point in time after the operation device 20 is attached to the portable device 1. For example, the reference position may be calculated by using a captured image in which the reference marker 21d has been detected in step S2, or may be calculated by using a captured image that is obtained from the infrared camera 4 at the point in time when the process of step S11 is performed. The calibration process may be performed by the system program before the launch of the application. For example, in other embodiments, the calibration process may be performed before the process of step S3 when the determination result of step S2 is affirmative.

In step S12, the control section 14 obtains a captured image from the infrared camera 4. In step S13 to follow, the control section 14 determines an operation performed on the operation device 20 based on the captured image obtained in step S12. That is, the control section 14 determines whether or not an operation has been performed for each of the operation buttons 22A to 22D by the method described in "[4. Determining operation performed on operation device]" above. Note that the reference position used in the process of step S13 is calculated in the process of step S11.

In step S14, the control section 14 performs a process in accordance with the content of the operation as determined in step S13. The specific content of the process is not limited to any particular content, and the process may be a process of controlling a character in accordance with the content of the operation in a case where a game application is performed, for example. In step S14, the process may be performed in accordance with operations performed on the operation sections (the input button 6 and the touch panel 3) of the portable device 1, as well as those performed on the operation buttons 22A to 22D.

In step S15, the control section 14 determines whether or not to end the application. The specific method for the determination in step S15 may be any method. In the present embodiment, it is determined to end the application when the user gives a predetermined ending instruction or when the operation device 20 is detached from the portable device 1. Specifically, the control section 14 performs a first determination process of determining whether or not the user has given a predetermined ending instruction, and performs a second determination process of determining whether or not the operation device 20 has been detached from the portable device 1. For example, the second determination process may be performed based on whether or not the reference marker 21d or the movable portions 23A to 23D has been identified from the captured image obtained in step S12. If the determination result of either the first determination process or the second determination process is affirmative, the control section 14 determines to end the application. In such a case, the control section 14 ends the application. On the other hand, the determination results from the first determination process and the second determination process are both negative, the control section 14 determines not to end the application. In such a case, the control section 14 performs again the process of step S12, and thereafter repeatedly performs the series of processes of steps S12 to S15 until it is determined to end the application in step S15.

As described above, in the present embodiment, if the operation device 20 is removed from the portable device 1 while the series of processes is performed in steps S12 to S15, the process of step S15 ends the application. Therefore, the user can end the application using the operation device 20 simply by removing the operation device 20 from the portable device 1. That is, the user does not need to perform an operation of ending an application, and thus the user operation is simplified in the present embodiment.

[6. Function and Effect of the Present Embodiment and Variations Thereof]

As described above, in the embodiment above, the operation device 20 can be attached to an information processing device (the portable device 1) including an image-capturing unit (the infrared camera 4), and has the following configuration:

a housing 21 of which the inside is visible from the outside through at least a portion thereof (a portion where the opening portion (the hole 21a) is formed);

a movable operation section (the operation button 22) at least a portion of which is exposed on the outside of the housing 21; and a movable portion 23 placed at a position inside the housing 21 that is visible from the outside of the housing 21 through the above portion of the housing 21.

The operation device 20 is attached to the information processing device at such a position that the image-capturing unit can capture an image of the inside of the housing 21 through the opening portion (see FIG. 8). The information processing device determines an operation performed on the operation section based on a captured image (a captured image including an image of the movable portion) obtained by the image-capturing unit (step S13), and performs a predetermined process based on the determined operation (step S14).

With the configuration described above, the movable portion 23 may change its position, may change its attitude, or may change its position and its attitude in response to the operation section being operated. The method for determining an operation performed on the operation section based on the captured image including the image of the movable portion 23 may be a method for determining an operation based on at least one of the position, the direction and the shape of the movable portion 23 in the captured image, for example.

With the above configuration, the information processing device to which the operation device 20 is attached can capture an image of the movable portion by means of the image-capturing unit, and determine an operation performed on the operation section based on the captured image. Therefore, it is possible to simplify the configuration of the operation device because the operation device does not need an electrical configuration for detecting the operation and transmitting the detection result to the information processing device.

Note that the information processing device to which the operation device is attached is not limited to a device including a display section as in the embodiment above, but may be a controller device such as a game controller, for example. For example, the game controller may be a game controller for capturing an image of an outside marker by means of a camera, and the operation performed on the game controller (e.g., an operation of pointing at the screen, or an operation of moving the game controller) may be determined based on the captured image. An operation device such as that of the embodiment above may be attached to such a game controller, and the camera of the game controller may capture an image of the movable portion of the operation device. Then, it is possible to determine the operation performed on the operation section based on the captured image obtained by the camera. The operation device may be attached to an information processing system including a controller, and a main console device that can be attached/detached to/from the controller. For example, the operation device may be attached to a portable information processing device (which can also be said to be an information processing system) including a main console device and a controller. For example, the controller may include the image-capturing unit, and determine an operation performed on the operation section based on the captured image obtained by the image-capturing device. Then, the main console device may perform a predetermined process based on the determined operation.

Note that it is not necessary that the operation device 20 be a device including no electrical configuration. In other embodiments, the operation device 20 may include an electrical configuration such as an electronic circuit. For example, the operation device 20 may include a communication section for communicating with another information processing device different from the portable device 1 to which it is attached. The operation device 20 may be electrically connected to the portable device 1, and may for example include a speaker for receiving a sound signal from the portable device 1 to output sounds. Even in the case of an electrical configuration as described above, it is possible according to the embodiment above to simplify the configuration of the operation device regarding the configuration for the operation section.

Note that the infrared camera 4 is used as the image-capturing unit for capturing an image of the movable portion in the embodiment above. Here, the image-capturing unit may be any image-capturing device (i.e., a camera) capable of capturing an image. In other embodiments, a visible light camera (a camera using a visible light image sensor, e.g., an RGB camera) may be used as the image-capturing unit. In such a case, the illuminating section 7 may be a flash provided in the information processing device used when capturing an image.

Note that the movable portion may include a recognition portion in an area that is visible from the outside of the housing through a portion of the housing 21 (the portion of the hole 21a), wherein the recognition portion is distinguishable from other portions (movable portions other than the identification portion and the inner wall surface of the housing). Note that "distinguishable" means that it can be distinguished by an image-capturing device (the infrared camera 4). For example, the movable portion may include, in the area, an identification portion that is different from other portions in terms of at least one of the shape, the design pattern, the color and the material. Then, the image-capturing unit can easily recognize the identification portion as distinguished from other portions.

In the embodiment above, at least a portion of the area of the movable portion 23 (the hatched area shown in FIG. 7) that is visible from the outside of the housing 21 through the opening portion of the housing 21 is formed by a member that can be distinguished by the infrared camera 4 from other portions. Then, it is possible to capture an image of the movable portion by using an infrared camera, and determine an operation performed on the operation section based on the captured image.

In the embodiment above, the operation section includes the operation button 22A and the operation button 22D that can be operated independently of each other. The operation button 22A and the operation button 22D are arranged in line with each other in the front-rear direction as seen through the opening portion (see FIG. 7). The movable portion includes the movable portion 23A of which the position (or the attitude) changes in response to the operation button 22A being operated, and the movable portion 23D of which the position (or the attitude) changes in response to the operation button 22D being operated (see FIG. 7). Here, the movable portion 23D is displaced from the movable portion 23A as seen through the opening portion (see FIG. 10). Then, even if a plurality of operation buttons are arranged in line with each other in the front-rear direction as seen from the image-capturing unit of the information processing device, it is possible to determine operations on the operation buttons by capturing an image of the movable portions.

In the embodiment above, on the inside of the housing 21, a predetermined reference marker 21d is provided at a position inside the housing 21 that is visible from the outside of the housing 21 through the opening portion of the housing 21. The position at which the movable portion is provided is different from the position at which the marker is provided (see FIG. 6). The information processing device recognizes the reference marker 21d in the captured image to determine an operation performed on the operation button 22 based on the position of the image of the movable portion 23 with respect to the reference marker 21d (the position of the image of the reference marker 21d) in the captured image. Note that the determination of the operation can be done based at least on one of the position, the direction and the shape of the image of the movable portion 23 with respect to the reference marker 21d.

Then, the information processing device can more accurately detect the position, the direction and/or the shape of the movable portion 23, and it is therefore possible to accurately determine an operation.

(Variation Regarding Operation Section of Operation Device)

Figure 15:
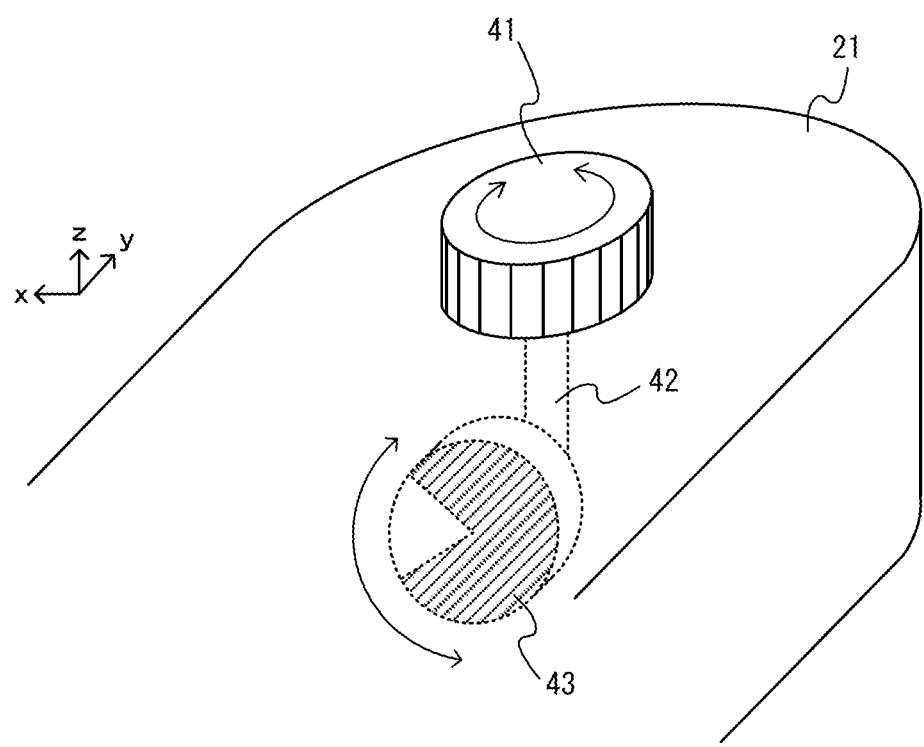
FIG. 15 shows an example rotational operation section of an operation device.
Figure 16:
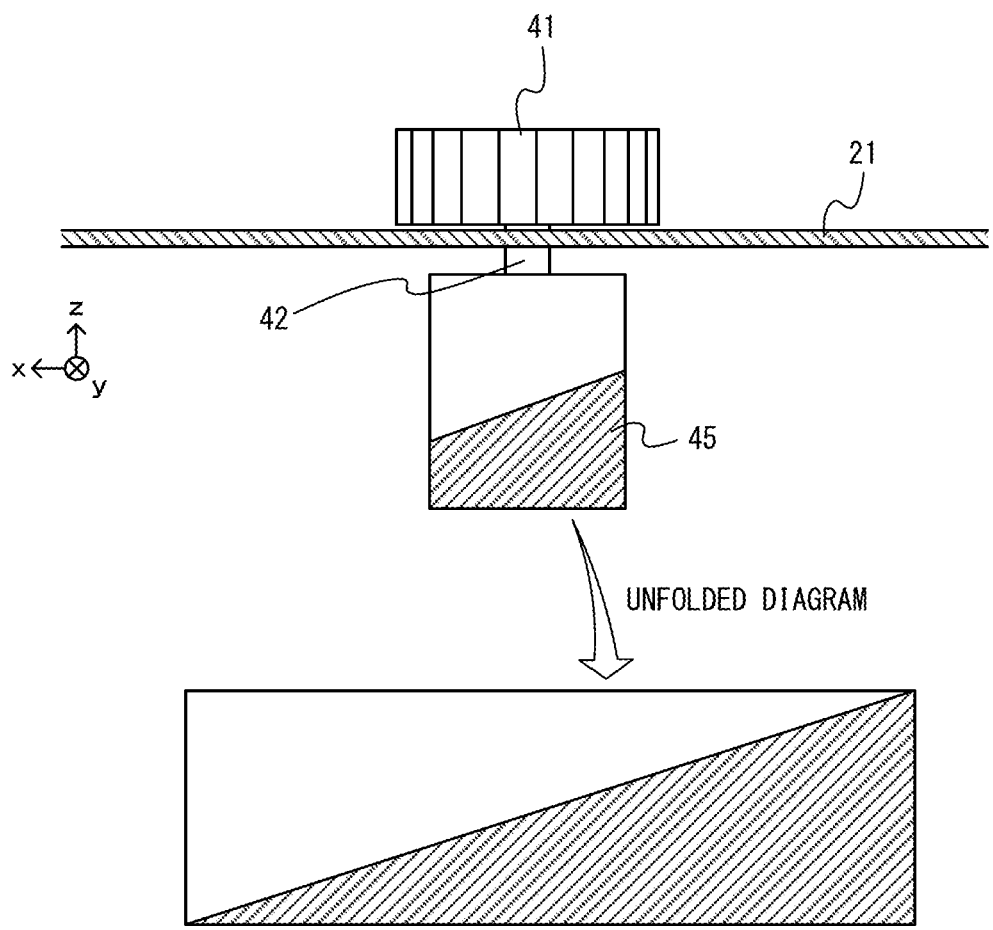
FIG. 16 shows another example rotational operation section of an operation device.

In other embodiments, the operation section of the operation device 20 may include an operation means other than an operation button. For example, the operation section may be a rotational operation section that can be rotated. Referring to FIG. 15 and FIG. 16, a variation where the operation device 20 includes a rotational operation section as an operation section will now be described.

FIG. 15 shows an example rotational operation section of the operation device 20. In the present variation, the operation device 20 includes a rotational operation section 41 that can be rotated by the user. Specifically, the rotational operation section 41 is provided on the outside of the housing 21, and is provided rotatably relative to the housing 21. Note that although the rotational operation section 41 can rotate about the z axis in FIG. 15, the direction of rotation may be any direction in other embodiments.

As shown in FIG. 15, the rotational operation section 41 is fixedly connected to a rotation shaft 42. A rotatable portion 43 is placed inside the housing 21, and the rotation shaft 42 is connected to the rotatable portion 43 via, for example, a gear (not shown). Although not shown in the figure, the rotatable portion 43 is supported inside the housing 21 so that the rotatable portion 43 can rotate in accordance with the rotation of the rotation shaft 42.

Although the rotatable portion 43 is configured so that the rotatable portion 43 can rotate about the y-axis direction in FIG. 15, the direction of rotation may be any direction in other embodiments (see FIG. 16). The rotatable portion 43 includes a recognition portion (hatched area shown in FIG. 15) whose direction changes by being rotated.

Also in the present variation, as in the embodiment above, the portable device 1 can determine an operation performed on the operation section based on the captured image obtained by the infrared camera 4. Specifically, the control section 14 of the portable device 1 captures an image of the rotatable portion 43 by means of the infrared camera 4, thereby obtaining a captured image including the image of the rotatable portion 43. Then, the control section 14 identifies, from the captured image, the image of the recognition portion of the rotatable portion 43, and calculates the angle of rotation of the rotational operation section 41 based on the identified image direction. The angle of rotation to be calculated may be an absolute value or a relative value relative to a predetermined reference (e.g., an angle of rotation calculated from the previously-obtained captured image). The portable device 1 performs a predetermined process using the calculated angle of rotation as an operation input.

Note that the mechanism of the rotatable portion 43 for calculating the angle of rotation of the rotational operation section 41 is not limited to the one described above, but may be any other mechanism. For example, in other embodiments, the rotatable portion connected to the rotational operation section 41 may be rotatable in the same rotation direction as the rotational operation section 41. FIG. 16 shows another example rotational operation section of the operation device 20. In FIG. 16, a rotatable portion 45 is connected to the rotational operation section 41 and the rotation shaft 42 so that they rotate about the same rotation axis. That is, the rotatable portion 45 rotates by the same amount in the same direction as the rotational operation section 41 in response to the rotational operation section 41 being rotated.

In FIG. 16, the rotatable portion 45 has a cylindrical shape. Here, a recognition portion is formed on the side surface of the rotatable portion 45 so that its height (length in the z-axis direction) varies depending on the angle of rotation (see the unfolded diagram of the side surface shown in FIG. 16). Then, in the captured image obtained by the infrared camera 4, the height of the image of the recognition portion of the rotatable portion 45 (e.g., the height of the image of the recognition portion at the central position in the left-right direction) varies depending on the angle of rotation. Therefore, it is possible to calculate the height based on the captured image, and to calculate the angle of rotation of the rotatable portion 45, i.e., the angle of rotation of the rotational operation section 41, based on the height.

Figure 17:
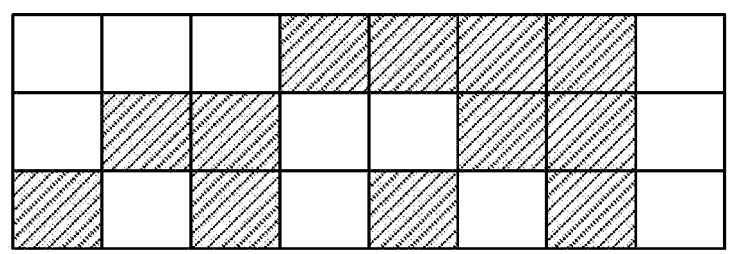
FIG. 17 shows another example of an unfolded diagram of a side surface of a rotatable portion.

As described above, the recognition portion is formed on the side surface of the rotatable portion 45 so that the recognition portion appears to have a different shape (or a different design pattern) depending on the angle of rotation. Note that the shape of the recognition portion is not limited to the shape shown in FIG. 16. FIG. 17 shows another example of an unfolded diagram of the side surface of the rotatable portion 45. In other embodiments, a design pattern as shown in FIG. 17 may be formed on the side surface of the rotatable portion 45 as the recognition portion. Then, the control section 14 of the portable device 1 detects the design pattern (pattern) of the recognition portion in a predetermined area (e.g., the central area in the left-right direction) of the image of the rotatable portion 45 included in the captured image. The control section 14 can calculate the angle of rotation of the rotatable portion 45, i.e., the angle of rotation of the rotational operation section 41, based on the detected pattern.

As described above, in the variation above, the operation section is configured to be rotatable. The movable portion (the rotatable portion 43, 45) rotates in accordance with the rotation of the operation section, and the shape and/or the design pattern of the movable portion as seen through the opening portion changes as the movable portion rotates. Then, based on the captured image (more specifically, based on the shape and/or the design pattern of the movable portion in the captured image), the portable device 1 determines an operation performed on the operation section (the angle of rotation). Then, the portable device 1 can determine an operation performed on the operation section, which is operated by being rotated by the user. That is, it is possible to use, as an operation device attached to the portable device 1, an operation device having an operation section that is operated by being rotated by the user.

In other embodiments, the operation section may be a stick that can be tilted in the up, down, left and right directions, or may be a slide pad that is slidable in the up, down, left and right directions. In the case of a stick or a slide pad, the movable portion is configured so that the movable portion moves in a direction depending on the tilt direction or the slide direction. Thus, it is possible to determine the tilt direction or the slide direction based on the image of the movable portion.

Note that although the movable portion 23 moves in the up-down direction, as seen through the opening portion (i.e., as seen from the image-capturing direction), in response to the operation section being operated in the embodiment above, the moving direction of the movable portion may be any other direction. For example, the movable portion may move in at least one of the left-right direction and the front-rear direction as seen from the image-capturing direction.

Note that the position (movement) in the up-down direction and the left-right direction can be determined based on the position (the position on the captured image) of the image of the recognition portion of the movable portion. The position (movement) in the front-rear direction can be determined based on the brightness value of the image (i.e., the value representing the brightness of each pixel in the captured image) of the recognition portion. That is, where the illuminating section 7 outputs infrared light, as the recognition portion is positioned more forward, the brightness value will be higher in an area of the recognition portion, and the portable device 1 can therefore determine the position of the movable portion in the front-rear direction based on the brightness value of the area. In the embodiment above, the position (movement) in the front-rear direction may be calculated by using detection results from the distance measuring sensor 5.

In the embodiment above, the portable device 1 determines whether or not the operation section is operated based on the captured image, and performs a predetermined process based on whether it is determined that the operation section has been operated. Note that although the portable device 1 performs a predetermined process in response to the operation section being operated in the embodiment above, the portable device 1 may, in other embodiments, perform a predetermined process in response to an operation on the operation section being released (e.g., the release of pressing of an operation button). In the variation shown in FIG. 15, the portable device 1 calculates the amount of operation on the operation section based on the captured image, and performs a predetermined process based on the amount of operation. Thus, for an operation performed on the operation device 20, the portable device 1 may calculate a digital input value (ON/OFF) or calculate an analog input value (an input value represented in three or more steps).

Note that even if the operation device 20 of the embodiment above is used, the portable device 1 can calculate an analog input value. That is, in the embodiment above, it is possible to calculate the amount of operation (amount of pressing) on the operation button 22 depending on the distance from the reference position described above to the movable portion image.

(Variation in which Process is Varied Depending on Type of Marker)

Figure 18:
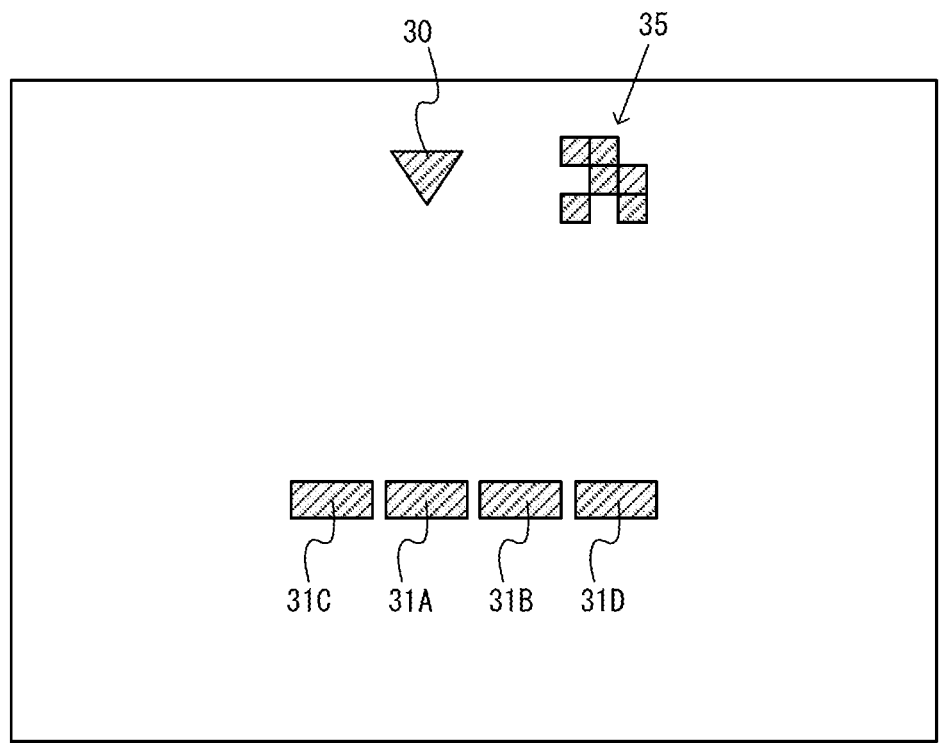
FIG. 18 shows an example captured image obtained by an infrared camera according to the present variation.
Figure 19:
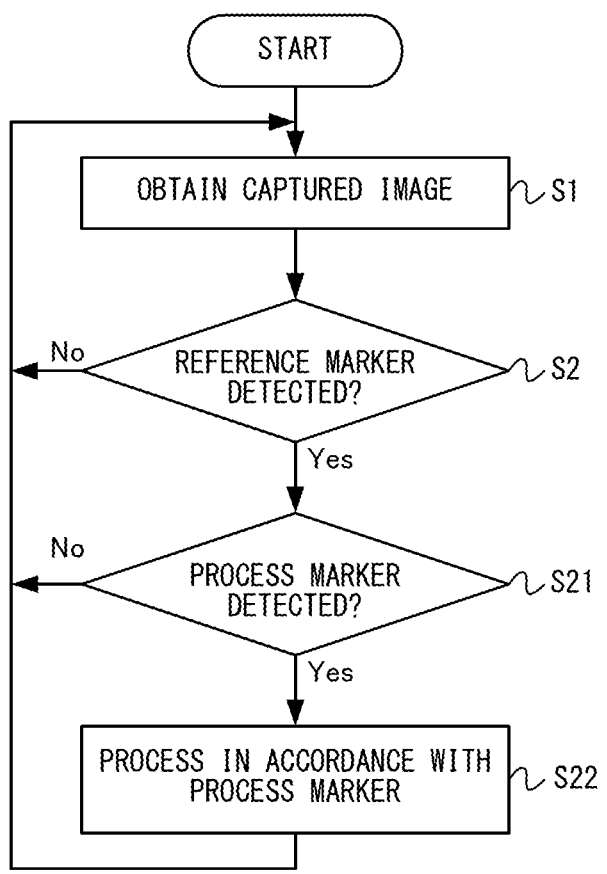
FIG. 19 is a flow chart showing an example of the flow of a process performed by a portable device according to the present variation.

Next, a variation in which the portable device 1 varies the process to be performed based on the type of the marker provided on the operation device. In the present variation, a process marker is provided on the inner wall surface of the housing 21 of the operation device 20. A process marker is a marker representing the content of the process to be performed when the process marker is detected. In the present variation, when a process marker is identified from the captured image, the portable device 1 performs a process in accordance with the process marker. Referring to FIG. 18 and FIG. 19, the details of the present variation will be described.

FIG. 18 shows an example captured image obtained by the infrared camera 4 according to the present variation. As shown in FIG. 18, according to the present variation, when the infrared camera 4 captures an image of the inside of the housing 21, the captured image includes an image 35 of a process marker, in addition to the reference marker image 30 and the movable portion images 31A to 31D. The shape of the process marker may be any shape. For example, the process marker may be a two-dimensional bar code.

FIG. 19 is a flow chart showing an example of the flow of a process performed by the portable device 1 according to the present variation. According to the present variation, a series of processes shown in FIG. 19 is performed, instead of the series of processes of the embodiment above shown in FIG. 13. The flow of the process of the present variation will now be described while focusing on its differences from the series of processes shown in FIG. 13.

Also in the present variation, as in the embodiment above, the processes of steps S1 and S2 are performed. In the present variation, the control section 14 performs the process of step S21 if the determination result of step S2 is affirmative. On the other hand, if the determination result of step S2 is negative, the process of step S1 is performed again as in the embodiment above.

In step S21, the control section 14 determines whether or not a process marker has been detected from the captured image obtained in step S1. The specific method for the determination process of step S21 may be similar to the determination process of step S2. If the determination result of step S21 is affirmative, the process of step S22 is performed. On the other hand, if the determination result of step S21 is negative, the process of step S1 is performed again.

Note that in other embodiments, the operation device 20 may not be provided with the reference marker 21d and be provided only with a process marker. Then, the portable device 1 may perform the process of step S21 following step S1.

In step S22, the control section 14 performs a process in accordance with the type of the marker detected in step S21.

Here, the method for identifying the process associated with the detected marker may be any method. For example, the portable device 1 may pre-store a table in which a plurality of types of markers are each associated with a process to be performed when the marker is detected. Then, in step S22, the portable device 1 identifies the process associated with the detected marker with reference to the table. For example, where the process marker is capable of representing information (e.g., where it is a two-dimensional bar code), information for identifying the process to be performed when the process marker is detected may be included in the information represented by the process marker. Then, the portable device 1 analyzes the detected marker to read information, and identifies, as the process to be performed, the process indicated by the read information.

The process to be performed in accordance with the type of the detected marker may be of any content. The process performed in step S22 may be, for example, a process of launching a predetermined application program with which the operation device 20 can be used. The process performed in step S22 may be a process of obtaining a predetermined application program with which the operation device 20 can be used. That is, the control section 14 may access a predetermined external device (e.g., a server capable of communicating with the portable device 1 via a network) to obtain the application program. Then, the obtained application program may be executed automatically. The process performed in step S22 may be a process of obtaining a web page from a server and displaying the web page on the display 2. For example, the web page to be displayed may be a web page for downloading an application program, or an advertisement of the vendor of the operation device 20.

Note that the control section 14 may change the type of the process to be performed depending on the type of the marker detected. That is, depending on the type of the marker detected, the control section 14 may perform one of the process of launching an application program, the process of obtaining an application program, and the process of displaying a web page. Depending on the type of the marker detected, the control section 14 may change the content of the process within the same process type. That is, depending on the type of the marker detected, the control section 14 may change the application program to be launched, change the application program to be obtained, or change the web page to be displayed.

In step S22, when the process in accordance with the type of the marker is ended, the control section 14 ends the process of step S22, and then performs again the process of step S1.

As described above, according to the variation above, the portable device 1 performs a different process depending on the type of the process marker recognized based on the captured image. Then, by providing a different process marker for each operation device, it is possible, when an operation device is attached to the portable device 1, for the portable device 1 to perform a process in accordance with the operation device.

As described above, according to the embodiment above and the variation above, inside the housing 21, a predetermined marker (the reference marker 21d or a process marker) is provided at a position inside the housing 21 that is visible from the outside of the housing 21 through an opening portion of the housing 21. The information processing device (the portable device 1) recognizes the predetermined marker in the captured image obtained by the infrared camera 4 (step S2, S21), and performs a predetermined process based on the marker recognition result (step S3, S15, S22).

Then, since the portable device 1 performs a predetermined process based on the marker recognition result, an appropriate process in accordance with an operation device attached to the portable device 1 can be performed without the user giving an instruction to perform the predetermined process. This makes it possible to save the trouble of the user having to give an instruction, and to reduce the possibility that an inappropriate process may be performed due to an erroneous operation by the user, or the like. This advantage can be realized not only when the accessory is an operation device, but also with any accessory that adds a function to the information processing device (portable device). That is, the accessory is not limited to an operation device that adds an operation function to the information processing device, but may also be a device that adds a predetermined function.

The "marker recognition result" may be the determination result indicating whether a marker has been recognized, or may be the result of identifying the type of the marker recognized. That is, the portable device 1 may perform a predetermined process (a process of launching an application, or a process of ending an application) based on the determination result indicating whether or not a marker has been recognized, as in the embodiment above. Alternatively, the portable device 1 may perform a predetermined process (a process performed in step S22) based on the result of identifying the type of the marker recognized, as in the variation above. The portable device 1 may be capable of recognizing a certain type of a marker, or may be capable of recognizing a plurality of types of markers.

For example, the "predetermined process" may be a process as follows. That is, the portable device 1 may determine that the operation device 20 has been attached to the portable device 1 when it is determined that the predetermined marker has been recognized. Note that when it is determined that the operation device 20 has been attached to the portable device 1, the portable device 1 may give the user a notification or may launch a predetermined application (as in the embodiment above).

Alternatively, if it is determined that the predetermined marker has been recognized, the portable device 1 may determine that an authentic operation device has been attached to the portable device 1 and allow a predetermined process to be performed on the portable device 1. If it is determined that the predetermined marker cannot be recognized, the portable device 1 may determine that an unauthentic operation device has been attached to the portable device 1 and prohibit the predetermined process from being performed. For example, the predetermined process may be the process performed in step S22 described above, or may be any other process.

As described above, the embodiment above can be applied to a portable device, such as a mobile telephone, a smartphone or a portable game device, and to an accessory (attachment) that can be attached to such a portable device, with the aim of providing an accessory with a simple configuration.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system including an information processing device having a camera, and an accessory to which information processing device is removably attachable, wherein:
   the accessory includes:
      a housing having an opening;
      a movable operation section at least a portion of which is exposed on the outside of the housing; and
      a movable portion placed at a position inside the housing, wherein a position and/or an attitude of the movable portion changes in response to the movable operation section being operated;
   the information processing device is attached to the accessory at such a position that the camera can capture an image of the inside of the housing through the opening; and
   one or more processor of the information processing system:
      determines an operation performed on the movable operation section based on a camera image captured by the camera and including an image of the movable portion; and
      performs a predetermined process based on the determined operation.

2. The information processing system according to claim 1, wherein:
   the processor determines whether or not the movable operation section is operated based on the camera image; and
   the processor performs a predetermined process based on whether or not the movable operation section is operated.

3. The information processing system according to claim 1, wherein:
   the processor calculates an amount of operation performed on the movable operation section based on the camera image; and
   the processor performs a predetermined process based on the amount of operation.

4. The information processing system according to claim 1, wherein:
   on the inside of the housing, a marker is provided at a position inside the housing, wherein the position at which the movable portion is provided is different from the position at which the marker is provided; and
   the processor recognizes the marker in the camera image to determine an operation performed on the moveable operation section based on at least one of a position, a direction and a shape of an image of the movable portion with respect to the marker in the camera image.

* * * * *